April 12, 1932.  A. S. MACDONALD  1,854,158
LIBRARY CONSTRUCTION
Filed July 2, 1930  7 Sheets-Sheet 1

INVENTOR
Angus S. Macdonald
BY
Synnestvedt & Lechner
ATTORNEYS

April 12, 1932.  A. S. MACDONALD  1,854,158
LIBRARY CONSTRUCTION
Filed July 2, 1930  7 Sheets-Sheet 2

INVENTOR.
Angus S. Macdonald
BY
Symmestvedt & Lechner
ATTORNEYS.

April 12, 1932.  A. S. MACDONALD  1,854,158
LIBRARY CONSTRUCTION
Filed July 2, 1930   7 Sheets-Sheet 4

INVENTOR.
Angus S. Macdonald
BY
ATTORNEYS.

April 12, 1932. A. S. MACDONALD 1,854,158
LIBRARY CONSTRUCTION
Filed July 2, 1930 7 Sheets-Sheet 7

INVENTOR.
Angus S. Macdonald
BY
ATTORNEYS.

Patented Apr. 12, 1932

1,854,158

UNITED STATES PATENT OFFICE

ANGUS S. MACDONALD, OF NEW YORK, N. Y., ASSIGNOR TO SNEAD & COMPANY, OF JERSEY CITY, NEW JERSEY, A CORPORATION OF NEW JERSEY

LIBRARY CONSTRUCTION

Application filed July 2, 1930. Serial No. 465,321.

This invention relates to library constructions such as are used, for example, in public libraries, university libraries and for the storage of archives and similar documents.

The nature, objects and advantages of the invention will be best understood from the following.

With regard to such constructions, it has been customary to provide a rather complicated steel work comprised of upright columns arranged in rows with transverse and longitudinally extending beams, with longitudinal angles at the ranges to provide deck slits, with curb angles, and the like. This construction is expensive, requires a great deal of preliminary engineering and is rather expensive to install, besides which it imposes certain practical limitations and difficulties, particularly with respect to the effective utilization of space in a building built large enough to take care of expected expansion. In this connection it is usually customary to make the building larger than is required and to employ only a portion thereof for book stacks. With the present form of construction it is not very practical to effectively utilize a space not occupied by stacks.

Furthermore, the present form of construction is such that full use of space which might otherwise be available for storage is not made.

In general I propose a simple and inexpensive structure which overcomes the foregoing objections and has other advantages such as may hereinafter appear.

In carrying out my invention I provide a series of main decks made of flat slab, reinforced concrete, which decks are supported by what may be termed upright book stack columns, the latter, in turn, being laterally supported by the decks, the flooring acting as diaphragms and the whole constituting a structural unit with the side walls of the building supporting some of the edges of the floors and constituting what may be termed the sheathing for the unit. Great transverse rigidity is provided which eliminates the necessity for otherwise connecting the stell columns, and in cases such as unusually long spans where it may be desirable to employ some simple forms of horizontal steel floor framing, it is usually unnecessary, according to my invention, to connect the framing and the steel columns with gusset plates or by welding to get stiff joints.

The construction is one which provides a maximum available space for book storage and can be used to the maximum extent. Very little preliminary engineering is required and much of the work can be done directly on the job. The construction is also one which lends itself readily to improvements in ventilation and lighting and affords better fire protection, and even if it is found in some instances desirable to fireproof the columns, this can be done without wasting an undue amount of book storage capacity. In this connection, the portion of the closely packed rows of ranges holding books forms a serious obstruction to the passage of air currents such as are ordinarily depended upon to ventilate rooms. The arrangement is also one which makes the book stacks much quieter and cleaner. The marble, glass or slate floors for the aisles usually supported by steel framework are entirely eliminated, and in place thereof a soft floor such as flexible tiling, linoleum, or the like, may be laid upon the concrete floors for deadening sound and for finish. Likewise, a partially completed stack can be left with the top slab temporarily serving as a roof slab but ready at any time to receive additional tiers of vertical columns, shelf supports, or the like, which can be installed without disturbance to the work of the library or destruction of any temporary construction, which has heretofore been necessary. The construction reduces the amount of drafting and shop fabrication work, as well as erection expense, over present constructions, in which all of the pieces of steel, marble slab, etc., must be carefully detailed to exactly fit the desired conditions.

Furthermore, the arrangement is one which affords great flexibility to accommodate for either wide variations in character of service or for expansion.

By way of illustration the particular requirements may be such as to make it desirable to have book stacks for library use and rolling cases for storage of papers and documents not so frequently used. The arrangement is such that it lends itself to the employment of any combination of library stacks and rolling cases on the same deck or floor or on different floors, as may be required. The advantage of this will be apparent from the following: In building university libraries, it is customary to provide seating for the proper percentage of the total student body, facilities for the work of the staff of the library, including both those who serve the students and those who catalogue or handle books, and accommodation for the books themselves. Experience has shown that the number of students of such an institution, if not definitely fixed to a maximum number, will increase approximately in arithmetical ratio, the number of books will increase approximately in geometrical ratio and the facilities of the staff in some ratio between that for the students and that for the books, all of which makes for a serious expansion problem heretofore not adequately solved.

According to my invention, I provide a plurality of regularly spaced stack columns, or what may be termed through stack columns, which support the flat slab floors before described, the spacing of such columns being sufficient for them to adequately support unloaded wide spans of such floors. I then arrange stacks to form a court in the center of the building, utilizing a space that is devoid of windows or only partially provided with them. The floors carrying such stacks, being loaded, I supplement the through stack columns by other readily emplaceable columns, which in addition to supporting the floors, also constitute a stack column. The through stack framework extending beyond the areas first necessary for book storage, is left stripped bare for the temporary formation of rooms, such as reading rooms, studies, offices, cataloging rooms, seminars, and the like. Temporary removable panels or thin panels that can be left permanently in place may be employed for the walls of such rooms. As the library grows, the rooms above mentioned may have their panels removed and then equipped with stacks, the readily emplaceable stack and floor columns being set up.

The stacks in the center may be carried part way or all the way up through the building. If the stacks are not carried all the way up, intermediate deck after deck may be added vertically, and the stacks may be expanded laterally. By intermediate decks are meant decks installed intermediate the main flat slab decks with which the building is provided when erected.

It will be seen that I can, within wide limits, use any arrangement or combination of library stacks and rolling cases, as hereinbefore described. As permanent library requirements increase, the room forming panels may be removed and shifted to new space, the rolling cases may be removed to new space, and standard or bracket cases installed in their place.

More specifically my invention contemplates the provision of certain improvements in details of design which will appear hereinafter more particularly.

I accomplish the foregoing by means of a construction which I have illustrated in the preferred form, in which—

Figs. 1a and 2a are fragmentary diagrammatic views illustrating how expansion is provided for by the through and the readily emplaceable columns; Fig. 2a being taken on the line 2a—2a of Fig. 1a;

Referring now to Figs. 1, 1a, 2 and 2a more particularly, the reference numeral 7 indicates the main flat slab decking heretofore described, which is carried from the upright or through stack columns 8 and which, in turn, are laterally supported by the flat slab decks. 9 are the outer walls of the building.

Figure 1:
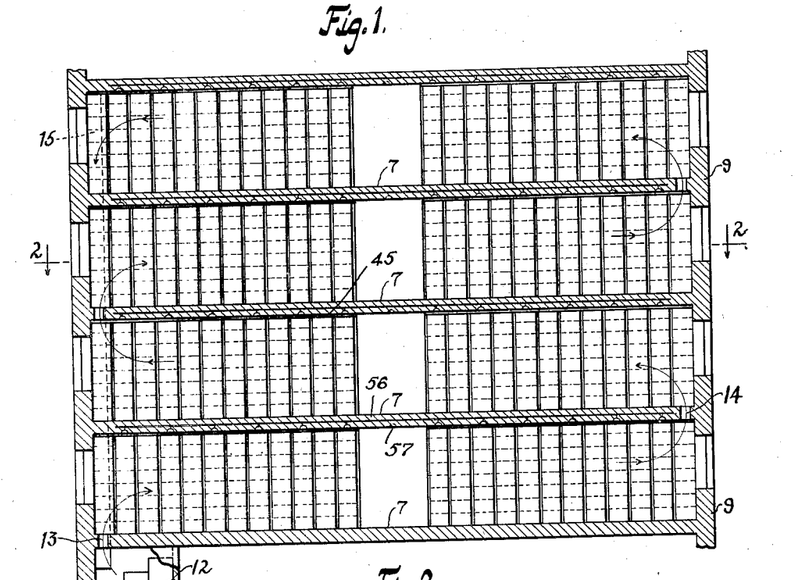
Fig. 1 is a more or less diagrammatic vertical section through a library book stack illustrating my improvements.
Figure 1A:
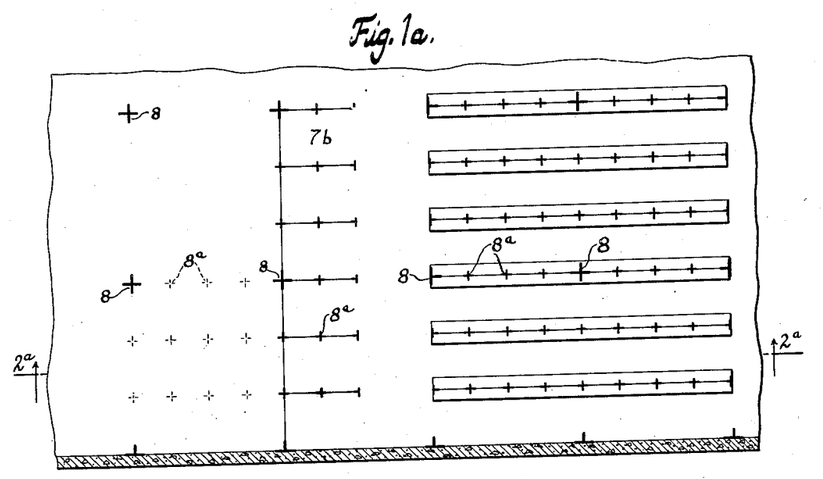
Figure 2:
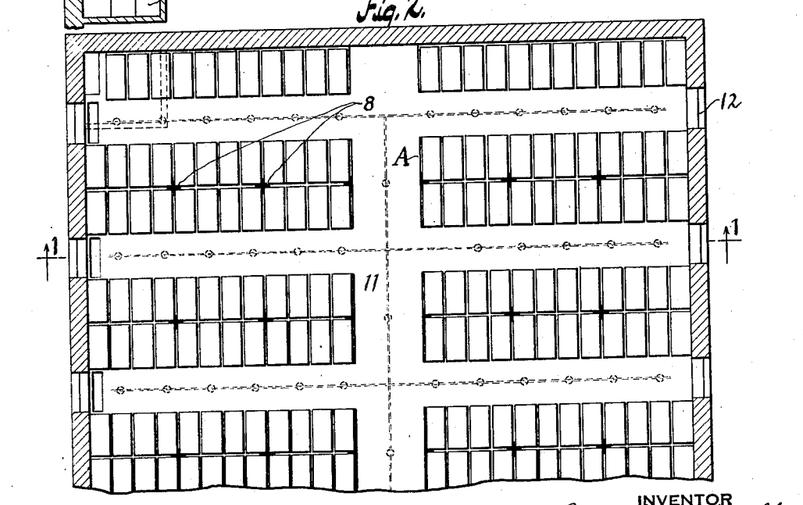
Fig. 2 is a fragmentary cross section taken on the line 2—2 of Fig. 1.
Figure 2A:
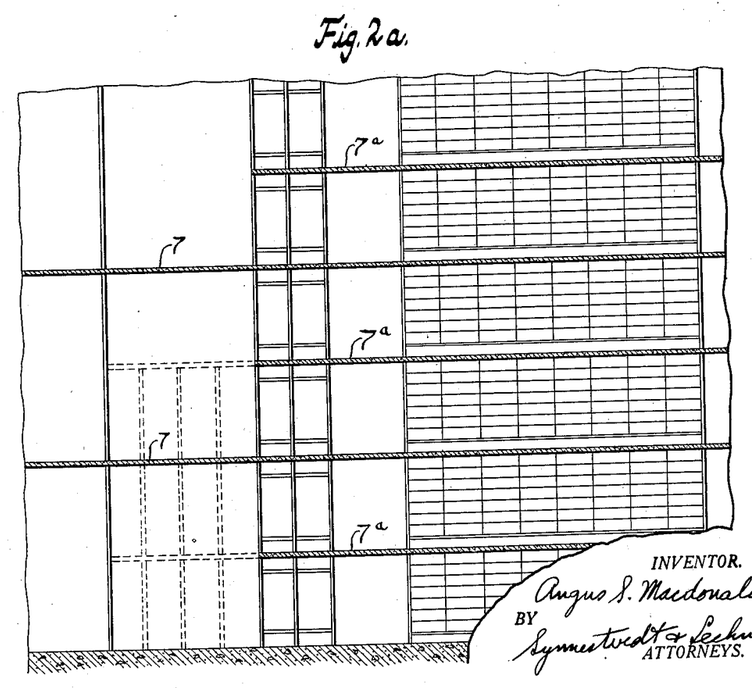

The through columns 8 are regularly arranged as will hereinafter be more particularly described, and are spaced so as to support wide but unloaded spans, and the ranges A are composed either of library stacks as shown in Figs. 1a and 2a or rolling cases, as shown in Figs. 1 and 2, the rolling cases being arranged in pairs end to end and the ranges being substantially uninterrupted, the spacing between columns of a row being a multiple of the width of a rolling case.

Intermediate the through columns, I arrange other and readily emplaceable columns 8a which support the floors and have the stacks associated therewith. They are put in as the library is expanded. Figures 1a and 2a illustrate some of the possibilities in arrangement. For example, only a portion of the decks 7a are in place, reading alcoves 7b are provided, and the surrounding areas may be used as hereinbefore pointed out.

The foregoing arrangements provide cross aisles and main aisles 11 with the windows 12 in the side walls located at the ends of the aisles.

The ranges extend substantially from floor to ceiling, thus dividing the interior into compartments. These compartments are ventilated as follows:

Conditioned air is supplied by the conditioning apparatus diagrammatically indicated at 12 to the aisles of the bottom floor through the circulation slits 13 located at the left hand end of the aisles. The air travels lengthwise of the aisles in the direction of the arrows and then passes to the next deck through slits 14 in the flat slab flooring and so on from deck to deck, the air finally returning through ducts 15 to the conditioning apparatus.

The slits described preferably constitute the only air circulating ports and it will be seen that the air sweeps over the space in front of the windows as it travels from deck to deck, thus securing more uniform temperature throughout the decks and preventing the formation of cold areas adjacent the windows. In addition, quietness and cleanliness are ensured because both sound and dust must travel lengthwise of a deck in order to reach an adjacent deck. While I have shown the air entering at ends of the aisles, it is to be understood that it may enter at any point, as at a stair well, from which it would travel to the side walls, and up through the slits to the next floor and then up through a stair well, and so on.

Figure 3:
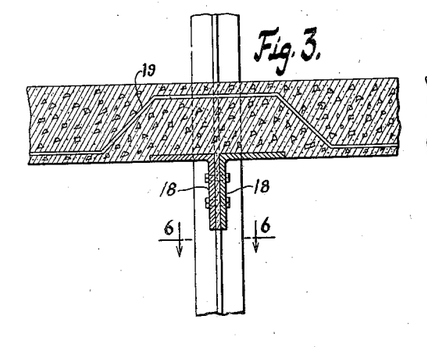
Figs. 3 to 9 inclusive are fragmentary sectional views illustrating various arrangements of the book stack columns and the support of the floors thereby.
Figure 4:
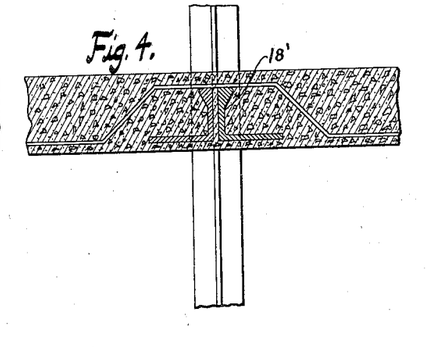
Figures 5, 6, 7, 8, 9:
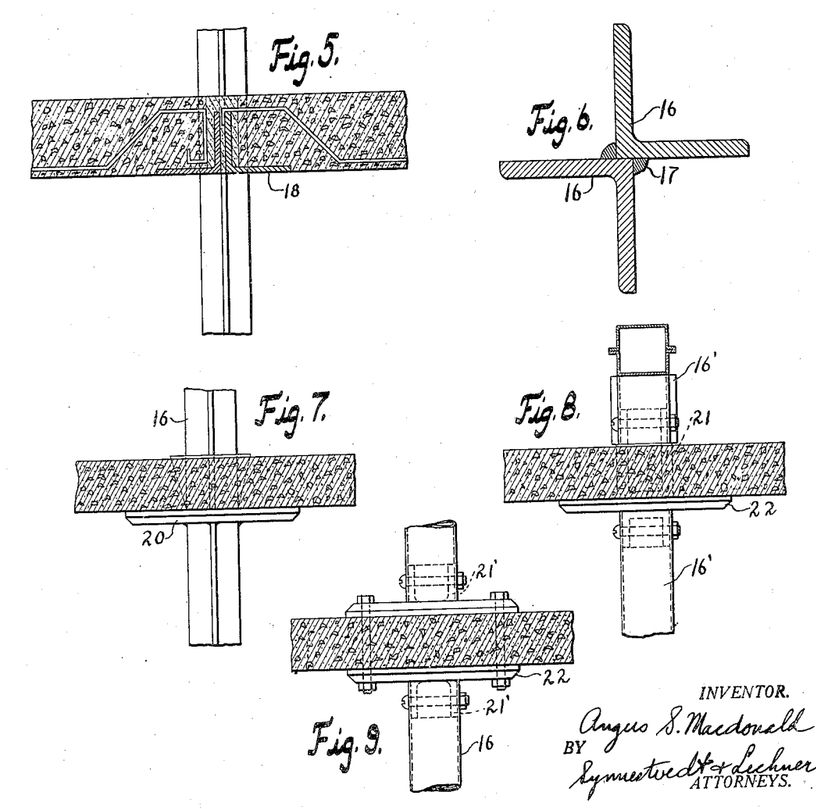

The through columns are preferably of the construction shown in Fig. 6 in order to effectively utilize all of the available space. They are comprised of two simple angles 16 welded together at their apices as shown at 17. As a preferred means for supporting the flat slab decking, I provide bracket-like members carried by stack columns. Thus, for example, in Fig. 3 I employ angles 18 on opposite sides of the column and bolted to legs thereof. The deck rests on the top of these angles 18, the reinforcing 19 being humped as shown. (In some instances, the angles 18 may extend from column to column, longitudinally of the rows. The deck slabs would then support the columns transversely of the rows.) In Fig. 4 the angles 18' are embedded in the floor and are of somewhat different construction in cross section. In Fig. 5 the angles 18' are the same as those employed in Fig. 3, but they are placed in an inverted position. They make it possible to provide for other dispositions of the reinforcing. In Fig. 7 a plate 20 is welded to the top of a length of columns and carries the flooring. The next length of columns rests upon the plate. This form is preferably used for the intermediate readily emplaceable columns, although it may also be used for the through columns. The term "through columns" is employed to indicate the main columns which are installed with the building when erected, and to distinguish these columns from the intermediate readily emplaceable columns.

I prefer to utilize the general form of column shown in Fig. 6 as it is of such character that the columns may be erected in the open and afterwards painted.

In the arrangement of Figs. 8 and 9 I have shown tubular columns 16' for the intermediates. The lengths of the columns in Fig. 8 are joined by members 21 which socket into the adjacent ends of the columns so as to transmit load. These members are provided with a plate or bracket 22 for supporting the decking. In the arrangement of Fig. 9 two members 21' are employed, each having a plate 22 with the tube plates bolted together with the deck in between.

As before noted, the cases extend practically from floor to ceiling so as to take advantage of the fire protection afforded by the floor construction and to provide seals against dust as well as fire. To this end, the front panels of a case are adapted to abut against a yielding or resilient strip 45 carried on a ceiling. Similar sealing material may be employed in the cases.

Thus the ranges of rolling cases are sealed off from the aisles and the spread of fire is prevented, as is circulation of dust.

The length of the rolling cases in relation to the distance between rows of stack columns is such that the aisles between ranges are sufficiently wide to permit of a case to be completely withdrawn with room for the attendant to pass around.

Figure 10:
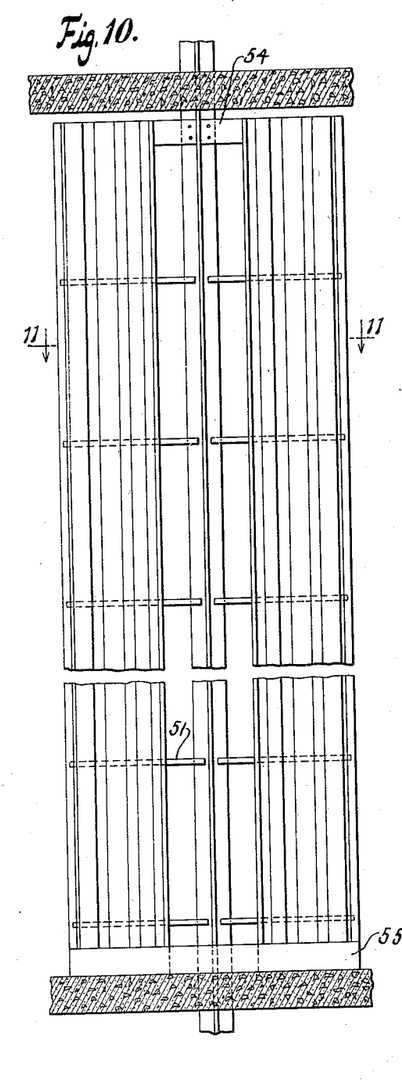
Fig. 10 is a side elevation of a library book stack of the type supported on the floor and illustrates how the shelf supports for the same are associated with the stack columns.
Figure 11:
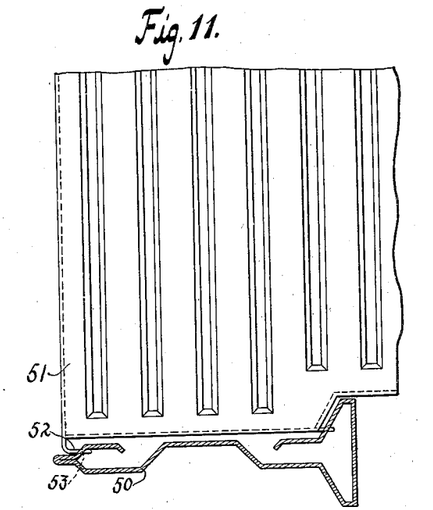
Fig. 11 is a fragmentary section taken on the line 11—11 of Fig. 10, drawn on an enlarged scale.

Referring now to Figs. 10 and 11, I have therein illustrated a range of library stacks in which the shelf supports 50 rest upon the deck. These shelf supports are formed of sheet metal and have the configuration in cross section shown in Fig. 11 so as to have substantial stability and strength and rigidity. They carry shelving 51 with hooks 52 adapted to project into recesses 53 in the shelf supports. The shelving in turn supports the shelf supports. At the ends of a range the end shelf supports may be secured to the columns as by plates 54. Bottom fixed shelves 55 for closing the floor and positioning the shelf supports may also be provided.

Figure 12:
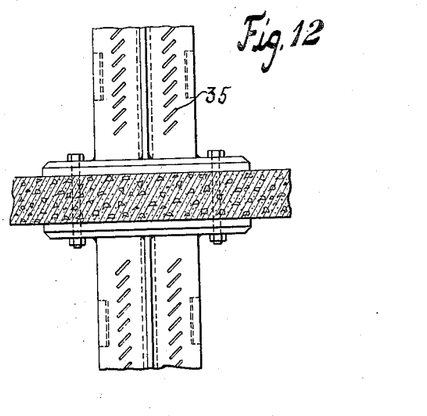
Fig. 12 is a fragmentary view illustrating the shelf supports for shelves of the bracket type.

In Fig. 12 I have shown the shelf supports as being provided with slanted slots 35 as before, to receive bracket shelves. The columns in this case tie to one another through the deck.

Figure 13:
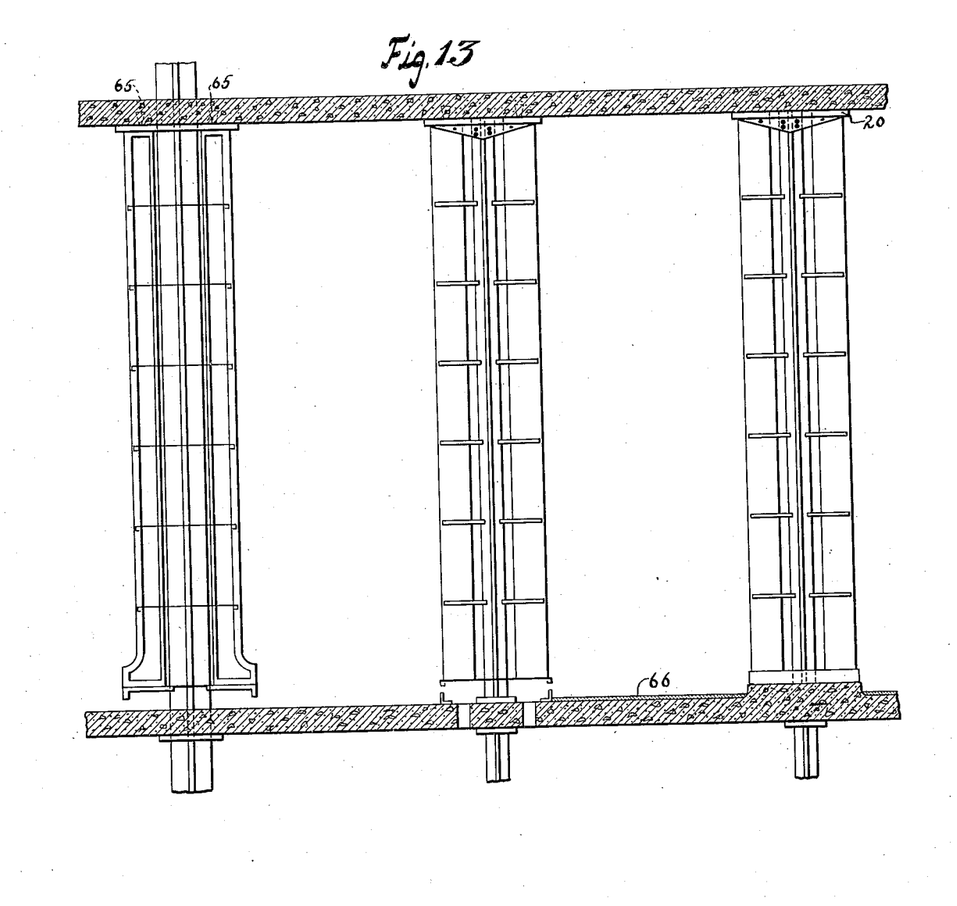
Fig. 13 is a diagrammatic side elevation illustrating suspended shelf supports.

For some installations it may be desirable to suspend the shelf supports from the brackets on the columns or from the deck itself, as by means of expansion bolts, or the like, and I have shown several such arrangements in Fig. 13. The left hand shelf supports are carried on suspension bolts 65, while the right hand supports are suspended from the brackets 20. According to these arrangements, bottom fixed shelves are also provided to position the lower ends of the suspended shelf supports. It will be noted in this figure that the deck may be raised beneath the range to provide a base portion to close off the range. This base serves as a mopping strip and also enables the use of linoleum 66 or other form of soft flooring to be placed over the concrete. Ventilation slits may be provided in the deck, beneath the range, as shown in the middle portion of Figure 13.

Assuming, now, that it is desirable to convert a portion of the book stacks of Figs. 1 and 2 into permanent library stacks, the rolling cases are removed and the shelf supports and shelving are arranged so that the stacks run lengthwise of the rows of columns back to back to provide a range. The aisles now left are much wider than before and intermediate ranges may be set up, there thus being three or four ranges of library stacks for every two ranges of rolling case stacks. This is accomplished by making the length of the library stacks a multiple of the width of the rolling cases and making the width of the library stacks in relation to the distance between the rows of through columns such that three or four ranges may be substituted for two while still providing adequate aisle space.

With respect to lighting, the lighting system diagrammatically indicated at 56 is buried in the concrete and there are sunken outlets 57 to provide for flush lighting fixtures, thus making it possible to use the entire distance from floor to ceiling.

By my invention, I am able to carry library buildings to heights heretofore impossible, without sacrificing the advantages hereinbefore described.

Figure 14:
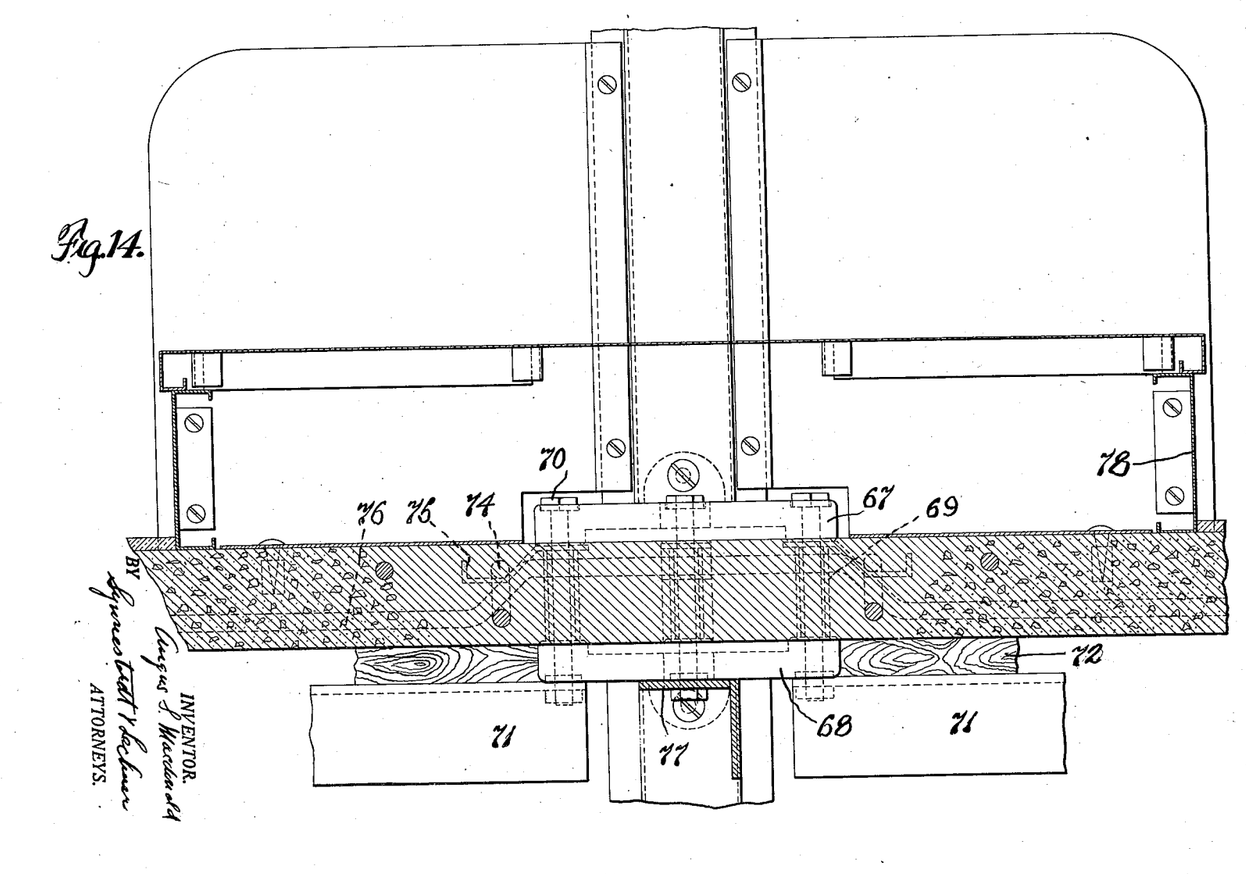
Fig. 14 is an enlarged sectional view illustrating the preferred way of carrying the form work, and certain other details of the invention.
Figure 15:
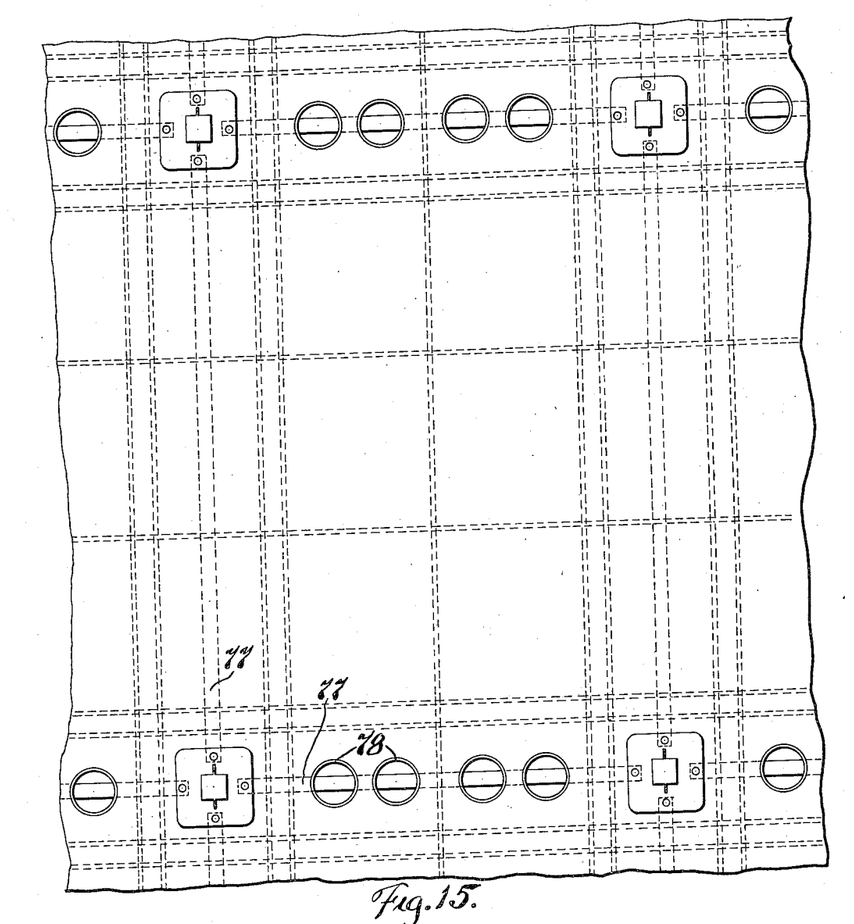
Fig. 15 is a fragmentary plan view showing the disposition of the reinforcing of Fig. 14.
Figure 16:
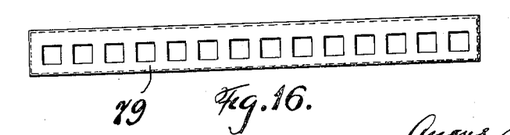
Fig. 16 is a side elevation of the kick plate of Fig. 14.

Referring now particularly to Figs. 14 to 16 inclusive, the preferred method of supporting the formwork for the concrete decks and certain other details of the invention will be described.

The columns are provided with plates 67 at the bottom and 68 at the top, and they are erected by interposing pipe lengths or sleeves 69 which vertically space apart the plates 67 and 68, and through which the holding bolts 70 are passed, there being any desired number of such bolts.

These bolts are used to temporarily support any desired form of carrying means, such for example, as the angles 71. The angles in turn support the boards 72 or other similar members used for the form. In this connection, I prefer to make the thickness of the plate 68 the same as the thickness of the boards to be used, so that the plates in effect become part of the form, although they are not removed as are the boards 72.

The reinforcing rods 73 are then emplaced, these being carried on clips 75 resting on top of the sleeves 69 and positioned by the bolts 70. The reinforcing rods 76 may be similarly supported or carried on the rods 74, as shown.

The concrete is now poured and the form is removed by taking off the nuts for the bolts and removing the angles 71 and the board 72. The nuts are then replaced and tightened home, giving the connection a maximum rigidity between the columns and the concrete slab. The reinforcing can go through undisturbed. It will be seen that the stack structure can be erected before any of the concrete is being poured, which means that the erection work can continue while the first slab is resting on the form.

The columns of a row may be tied together by members 77, two of the bolts 70 being used for this purpose.

Where ventilation is provided beneath the bottom shelf, short pipe vents 78 may be carried upon the members 77. These will remain in place in the concrete and will transfer all compression stresses. The tension members are left undisturbed. Where such pipe vents are employed, the kick plates 79 are apertured, as shown in Figure 16.

No claim is directed to the ventilation shown and described as this constitutes the subject matter of my copending application Serial No. 585,009, filed January 6, 1932.

I claim:

1. In a system of library construction, a plurality of through stack columns, arranged in rows widely spaced apart but providing support for a span of unloaded floor, floors carried thereby, intermediate emplaceable stack columns adapted to be arranged in rows between the through columns, and also adapted to furnish the additional support required for the spans of flooring when loaded with stacks, said columns being adapted to have associated therewith, shelf supports and shelves and said shelf supports and shelves, the floors affording lateral support for stack columns; whereby a portion of the building may be occupied by complete stacks and other portions may have a portion of the columns and, if desired, intermediate decks, omitted to provide for rooms.

2. In a system of library construction, a plurality of through stack columns, arranged in rows widely spaced apart but providing support for a span of unloaded floor, floors carried thereby, intermediate emplaceable stack columns adapted to be arranged in rows between the through columns, and also adapted to furnish the additional support required for the spans of flooring when loaded with stacks, said columns being adapted to have associated therewith, shelf supports and shelves, and said shelf supports and shelves, the floors affording lateral support for stack columns; whereby a portion of the building may be occupied by complete stacks and other portions may have a portion of the columns and, if desired, intermediate decks, omitted to provide for rooms, and means adapted to be secured to said through columns to provide said rooms.

3. In a system of library construction, a plurality of through stack columns, arranged in rows widely spaced apart but providing support for a span of unloaded floor, floors carried thereby, intermediate emplaceable stack columns adapted to be arranged in rows between the through columns, and also adapted to furnish the additional support required for the spans of flooring when loaded with stacks, said columns being adapted to have associated therewith, shelf supports and shelves, and said shelf supports and shelves, the floors affording lateral support for stack columns; whereby a portion of the building may be occupied by complete stacks and other portions may have a portion of the columns and, if desired, intermediate decks, omitted to provide for rooms, and removable walls adapted to cooperate with the through columns to provide said rooms.

4. In a library building, a stack occupying a portion thereof and having complete stack structure, partially complete stack structure adjacent the stack, the flooring being carired by the said stack structures, and means adapted to cooperate with the incomplete stack structure to provide rooms.

5. In library construction, walls and roof, a tier of main floors extending between the walls, relatively widely spaced through columns supporting the floors and in turn supported thereby, and a plurality of readily emplaceable columns arranged between the first mentioned columns, the two sets of columns being arranged in rows, said emplaceable columns supporting the floors and being in turn supported by the floors, and floors intermediate the main floors adapted to be carried by the columns and in turn to support the columns; all of said floors being of reinforced construction and being substantially continuous and the spacing of the columns being such, that spans of the floors between columns will support the load.

6. In library construction, walls and roof, a tier of main floors extending between the walls, relatively widely spaced through columns supporting the floors and in turn supported thereby, and a plurality of readily emplaceable columns arranged between the first mentioned columns, the two sets of columns being arranged in rows, said emplaceable columns supporting the floors and being in turn supported by the floors, and floors intermediate the main floors adapted to be carried by the columns and in turn to support the columns; all of said floors being of reinforced construction and being substantially continuous and the spacing of the columns being such, that spans of the floors between columns will support the load, said columns being cruciform in cross section.

7. In library construction, walls and roof, a tier of substantially continuous floors extending between the walls, relatively widely spaced through columns supporting the floors, and in turn supported thereby, readily emplaceable columns arranged between the first columns, in rows therewith, and shelf supports and shelving adapted to be associated with the rows of columns to provide ranges with aisles therebetween.

8. Library construction comprising a plurality of rows of substantially regularly arranged capless columns, the columns being spaced apart from one another in one direction a distance equal to a double case plus an aisle and substantially no farther apart from one another in a direction at right angles to the first direction, and a tier of floors, beamless between rows of columns, carried by the columns and having just sufficient thickness to carry the load and offer lateral support to the columns.

9. Library construction comprising a plurality of rows of substantially regularly arranged columns, the columns being spaced apart from one another in one direction a distance equal to a double case plus an aisle and substantially no farther apart from one another in a direction at right angles to the first direction, and a tier of floors, beamless between rows of columns, carried by the columns and having just sufficient thickness to carry the load and offer lateral support to the columns, the columns having relatively thin floor carrying plates whereby the floors are supported without substantial sacrifice of headroom.

In testimony whereof I have hereunto signed my name.

ANGUS S. MACDONALD.